Jan. 8, 1924.  1,479,954
A. BRIGDEN
BOLL WEEVIL MACHINE
Filed Feb. 24, 1923  2 Sheets-Sheet 1
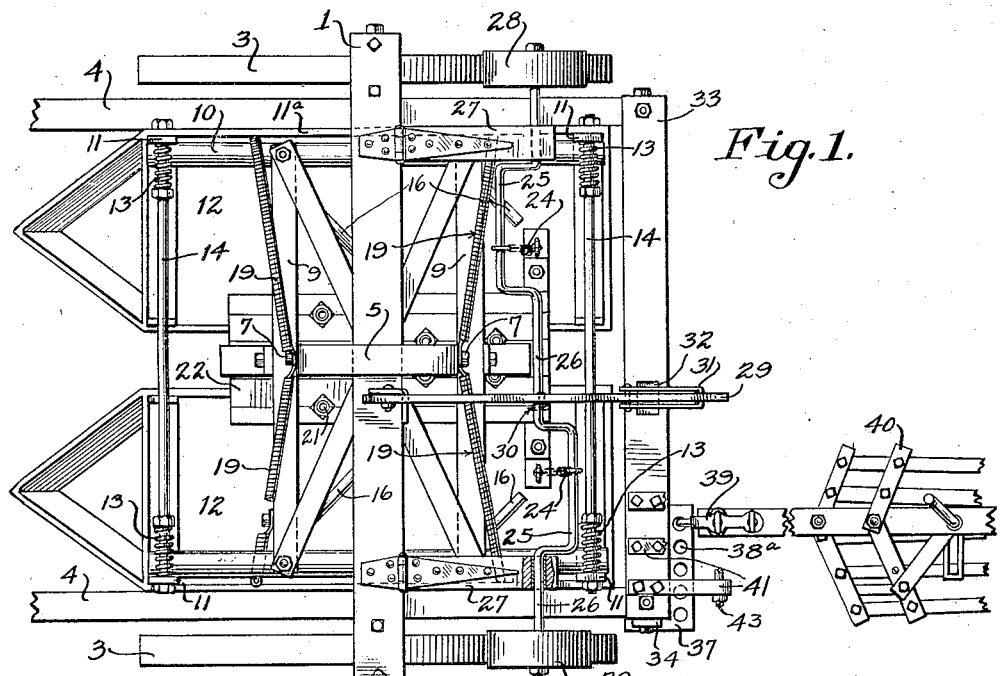
Fig.1.
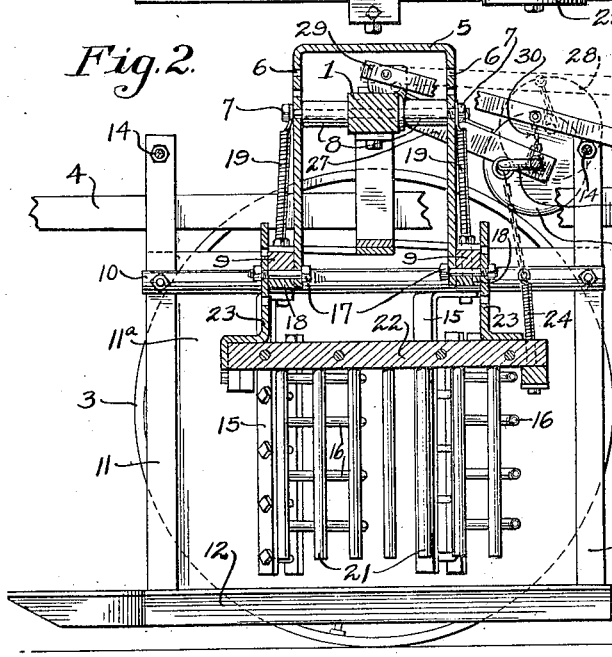
Fig.2.
Fig.5.
INVENTOR
Arthur Brigden
WITNESSES
BY
ATTORNEY

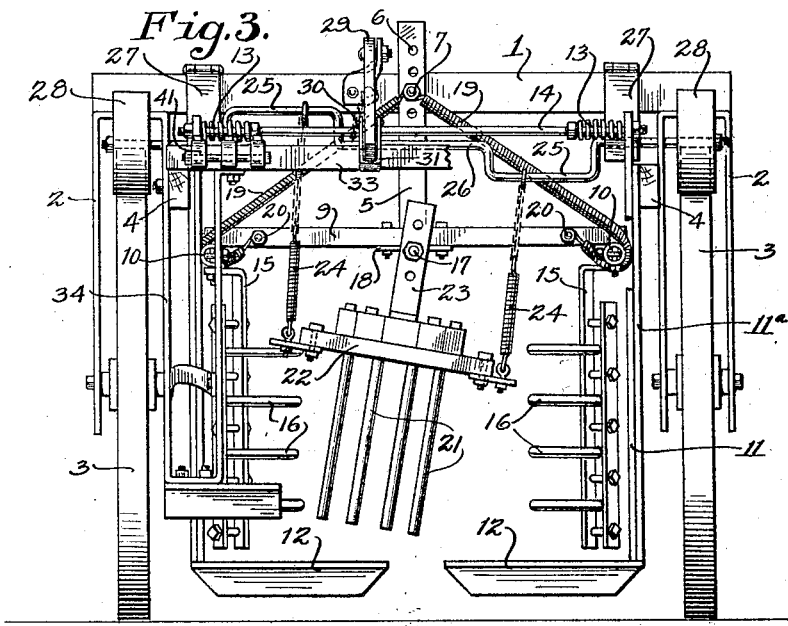

Patented Jan. 8, 1924.

1,479,954

UNITED STATES PATENT OFFICE.

ARTHUR BRIGDEN, OF BIRMINGHAM, ALABAMA.

BOLL-WEEVIL MACHINE.

Application filed February 24, 1923. Serial No. 620,998.

*To all whom it may concern:*

Be it known that I, ARTHUR BRIGDEN, a citizen of the United States, residing at Birmingham, in the county of Jefferson and State of Alabama, have invented new and useful Improvements in Boll-Weevil Machines, of which the following is a specification.

This invention relates to improvements in boll weevil machines, and is designed especially as an improvement on the machine disclosed in my co-pending application Serial No. 584,969, filed August 29, 1922.

The present invention has among its objects the provision of means for controlling the position of the weevil catching devices whereby to maintain the same at all times in proper relation to the row of cotton plants and thereby promote the efficiency of the machine; the provision of means for attaching a cultivator to the frame of the machine whereby the plants may be cultivated and the weevils removed therefrom at a single operation; and further to provide practical and easily manipulated means for rendering each of these instrumentalities inoperative while passing to and from the field.

The machine which is the subject of the present invention includes a wheel-supported frame adapted to straddle a row of cotton plants and having weevil-catching pans which are supported near the ground underneath the plants and is provided with a depending transversely-rocking frame having fingers with which to reach the small plants. Provision is also made for permitting either of the pans to yield upwardly whenever they come in contact with a clod of earth or the like and to quickly restore them to their normal position in which they are supported in the same horizontal plane adjacent to the stems of the plants. The transversely rocking frame is actuated from the ground wheels in a manner similar to that shown in my aforementioned application, and provision is also made for raising this driving mechanism and for locking the same out of driving relation to the ground wheels.

The machine is also provided at one side near the ground with a hitch plate to which the clevis of a cultivator may be connected in such a manner that the beam of the cultivator may be swung upwardly to raise the cultivator teeth out of the ground and means are also provided for securing the same in its raised position while passing to or from the field.

The nature of my invention will be better understood from the following detailed description taken in connection with the accompanying drawings, which illustrate the preferred form.

In the drawings:—

Fig. 1 is a plan view of the machine in operative position.

Fig. 2 is a central longitudinal section thereof.

Fig. 3 is a rear elevation of the machine, with the cultivator detached.

Fig. 4 is a side elevation showing the cultivator in full lines in inoperative position, with the driving mechanism for the plant agitators in inoperative position.

Fig. 5 is a detail view of the means for equalizing the position of the weevil catching frame.

Fig. 6 is a detail perspective view of the cultivator attaching means.

The machine includes a central transversely-extending beam 1 which is supported at each end by the depending hangers 2 which are supported upon the axles of the ground wheels 3. Longitudinally extending side bars 4 are secured to the hangers 2 and may be provided at their forward ends with suitable shafts for the attachment of a draft animal.

At the longitudinal center of the machine, a yoke 5 is supported from the transverse bar 1, the yoke being provided with a series of perforations 6, whereby the yoke may be vertically adjusted and supported by means of a bolt 7 extending through the beam 1 and provided with spacing sleeves 8 against which the inner sides of the yoke rest.

A pair of transverse bars 9 are centrally pivoted to the lower ends of the yoke arms and at their outer ends carry longitudinal bars 10 having depending vertical hangers 11 which support the weevil catching pans 12. The hangers 11 have secured thereto side plates 11ª which direct the weevils downwardly into the pans as they are knocked from the plants. The pans 12 and hangers 11 are permitted to have a limited transverse rocking movement to allow for variations laterally in the position of the plants, and the hangers are extended upwardly and connected by transverse rods 14 having cushioning springs 13.

The longitudinal bars 10 also carry spaced depending hangers 15 which support horizontal flexible fingers 16 that extend inwardly toward the center line of the machine where their free ends are adapted to come into contact with the plants and to knock off the weevils therefrom when the plant has become fully or nearly matured. When the plants are young, however, these fingers, which may be formed of coiled springs, rubber tubing or the like, are adapted to be swung out of the way and the depending fingers 21 are brought into play for removing the weevils from the small plants. These fingers 21 are carried by a frame 22 which is supported by bars 23 pivoted to the bolts 17 which are secured by clips 18 to the transverse bars 9 and also form the pivots on which the bars 9 are supported. The frame 22 is rocked by means of flexible elements 24 connected to the cranks 25 of a transverse crank shaft 26 which is journaled in longitudinal vertically swinging arms 27 and driven by means of rollers 28 from the ground wheels 3.

For the purpose of disconnecting the crank shaft 26 from the ground wheels, a lever 29 is pivotally connected at its forward end to the frame of the machine, and is provided with a chain 30 or other flexible connection with the crank shaft 26, but said lever normally rests upon a rear transverse frame member 33 with the chain 30 idle. The lever 29, however, is provided with a dog 31 which, when the lever is raised as shown in dotted lines in Fig. 2, may engage in a depression 32 formed in the upper surface of the frame piece 33, thus locking the lever in its upper position and holding the crank shaft 26 in raised position with the driving rollers 28 out of contact with the ground wheels.

As the machine passes along a row of cotton plants, the pans 12 are normally quite close to the ground so as to pass underneath the branches. In case one of the pans encounters a clod of earth or other obstruction, the bar 9 being centrally pivoted on the bolt 17, will permit the pan to ride over the obstruction. In order to immediately restore the pans to their proper position and to equalize the height thereof, I have provided a plurality of coiled springs 19 which are connected at their upper ends to the bolt 7, and pass downwardly around the longitudinal supporting bars 10 and are secured at their lower ends to the bars 9, as shown at 20; thus the springs will constantly tend to equalize the position of the supporting bars 9 and the weevil-catching devices supported thereby.

The machine described in my aforementioned application was designed to be pushed manually over the field, while the present machine is designed to be drawn by a draft animal, and is provided with means for attaching a cultivator, whereby the plants may be cultivated and the weevils removed therefrom in a single passage along the row. The means which I have provided for attaching a cultivator comprises a stirrup 34 which is secured to one of the frame pieces, as 4, and depends therefrom, the lower portion of the stirrup being suitably braced as by the brace bar 35 extending rearwardly from the axle, and secured to one side of the stirrup and having a branch 36 connected with the other side. A hitch plate 37 is secured to the lower end of the stirrup and is provided with a row of perforations 38 for lateral adjustment. A second row of larger perforations 38$^a$ is provided along the rear side of the hitch plate through any one of which may be inserted the clevis 39 of a cultivator 40. Thus, either the perforations 38 or 38$^a$ may be used for adjusting the cultivator laterally so as to bring it midway between the rows of cotton while the pans 12 straddle one of the rows.

One of the transverse frame members, as 33, is provided with a plurality of rearwardly-extending fingers 41, three fingers being shown in the drawings. These fingers are spaced a sufficient distance apart to receive between them the beam 42 of the cultivator, the ends of the fingers being formed into eyes which receive a pin or bolt 43. When the cultivator is not being used, therefore, as for instance when passing from one field to another, the cultivator may be swung upwardly about its pivotal connection with the plate 37 and locked by means of the pin 43 in the position shown in Fig. 4.

From the foregoing description, it will be seen that the present invention improves the efficiency of the weevil-catching device as well as rendering the machine adaptable for cultivating the plants at the same time. The weevil-catching mechanism is always maintained in proper position and the cultivator has a wide range of adjustment whereby to adapt it to rows different distances apart. While the machine may be used simultaneously for both operations, it will be obvious that either the weevil catcher or the cultivator may be used while the other is rendered inoperative. The cultivator may also be readily detached and used independently if desired.

While I have shown and described the specific structure of what is at present the preferred form of the invention, it will be understood that this is merely illustrative, and that various modifications may be made therein within the scope of what is claimed, without departing from the spirit of the invention.

What is claimed is:—

1. In a boll weevil machine, a wheeled supporting frame having a centrally pivoted transverse bar, means depending from the bar on opposite sides of its pivot to embrace a row of cotton plants to brush insects therefrom and to catch the insects, and resilient means connected to the bar on each side of its pivot to hold the bar normally horizontal and the brushing and catching means on each side at equal height but yielding to permit the same to pass over clods and the like.

2. In a boll weevil machine, a wheeled supporting frame having a depending yoke, transverse bars centrally pivoted to the yoke, insect-catching pans supported from said bars and adapted to pass underneath the plants on each side of the stems as the machine moves over the field, said bars being rockable about their pivots to permit either pan to pass over a clod or the like, and equalizing springs extending from the yoke to the bars at each side of their pivots and operable to restore the bars to horizontal position.

3. A boll weevil machine comprising a wheeled supporting frame including a transverse supporting bar, a rocking frame supported from said bar, longitudinal vertically swinging arms hinged to the transverse bar, a crank shaft journaled in said arms and normally having a driving connection with the ground wheels, means connected with the cranks for actuating the rocking frame, and a lever pivoted to the frame and having a connection with the crank shaft, said lever being adapted to swing upwardly about its pivot to raise the crank shaft and disconnect the same from the ground wheels.

4. A boll weevil machine comprising a wheeled supporting frame including a transverse supporting bar, a rocking frame supported from said bar, a crank shaft journaled in the frame and normally having a driving connection with the ground wheels, means connected with the cranks for actuating the rocking frame, a lever pivoted to the frame and having a connection with the crank shaft and adapted to be raised to disconnect the crank shaft from the ground wheels, and a dog pivoted to the lever and engageable with a portion of the frame to form a rest for the lever to hold it in raised position.

5. In a boll weevil machine, a wheeled supporting frame having a centrally pivoted auxiliary frame, a pair of pans suspended from the auxiliary frame in opposed relation and adapted to straddle a row of plants, resilient equalizing means for normally maintaining the pans at equal heights but yieldable to permit relative vertical movement of the pans to pass over obstructions, and means for agitating the plants to knock the insects therefrom into the pans.

6. In a boll weevil machine, a wheeled supporting frame, a supplemental frame mounted to oscillate transversely thereof and having depending fingers, a transverse floating shaft having wheels normally resting by gravity on the ground wheels and driven thereby, means connecting the shaft to the oscillatory frame at each side of its pivot and operable upon rotation of the shaft to pull said oscillatory frame back and forth across the plant row, a lever pivoted to the wheeled frame and operable when raised to raise said shaft out of operative relation to the ground wheels, a dog pivoted to the lever, said wheeled frame having a depressed portion forming a rest for the end of the dog to hold the lever in raised position to lock the shaft in inoperative position.

7. In a boll weevil machine, a wheeled supporting frame having a centrally pivoted auxiliary frame, a pair of pans suspended from the auxiliary frame in opposed relation and adapted to straddle a row of plants, equalizing springs for normally maintaining the pans at equal heights but yieldable to permit relative vertical movement of the pans to pass over obstructions, a third frame mounted to oscillate transversely above the pans and having depending fingers, a transverse floating shaft having wheels normally resting by gravity on the ground wheels and driven thereby, means connecting the shaft to the oscillatory frame at each side of its pivot and operable upon rotation of the shaft to pull said oscillatory frame back and forth across the plant row, and means for positively raising said shaft and locking the same out of operative relation to the ground wheels.

In testimony that I claim the foregoing as my own, I have hereto affixed my signature.

ARTHUR BRIGDEN.